United States Patent
Ibuki et al.

(10) Patent No.: US 6,351,089 B1
(45) Date of Patent: Feb. 26, 2002

(54) CONTROL SYSTEM FOR A LINEAR VIBRATION MOTOR

(75) Inventors: Yasuo Ibuki; Hidetoshi Amaya; Toyokatsu Okamoto, all of Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/599,450

(22) Filed: Jun. 22, 2000

(30) Foreign Application Priority Data

Jun. 25, 1999 (JP) ............................................ 11-180911

(51) Int. Cl.⁷ ............................................... H02K 33/16
(52) U.S. Cl. .................. 318/128; 310/68 B; 310/68 R; 310/19; 310/31; 318/127; 318/119
(58) Field of Search ............................... 310/15, 17, 19, 310/28, 68 R, 68 B, 31; 318/114, 119, 127, 128

(56) References Cited

U.S. PATENT DOCUMENTS

| | | | |
|---|---|---|---|
| 5,202,612 A | 4/1993 | Yoshida et al. ............. 318/138 |
| 5,632,087 A | 5/1997 | Motohashi et al. ......... 30/43.92 |
| 5,837,885 A | * 11/1998 | Goodbread et al. ......... 73/32 A |
| 5,866,998 A | 2/1999 | Menegoli .................... 318/251 |

FOREIGN PATENT DOCUMENTS

| | | |
|---|---|---|
| JP | 49-77116 | 7/1974 |
| JP | 62285655 | 12/1987 |
| JP | 63314191 | 12/1998 |

* cited by examiner

*Primary Examiner*—Nestor Ramirez
*Assistant Examiner*—Judson H. Jones
(74) *Attorney, Agent, or Firm*—Rader, Fishman & Grauer, PLLC (57) ABSTRACT

A control system for a linear vibration motor capable of eliminating necessity of a separate sensor of detecting the motion of the motor. The linear vibration motor includes a stator provided with a winding, and a vibrator provided with a permanent magnet. The winding is fed with a drive current to generate a magnetic field which interacts with the permanent magnet to cause the vibrator to reciprocate linearly relative to the stator for producing a vibration. The control system includes a controller which detects an ongoing amplitude, i.e., the motion represented by the displacement, speed, or acceleration of the vibrator and provides ON-periods of feeding the driving current to the winding in a varying amount based upon the ongoing amplitude detected in order to keep a vibration amplitude of the vibrator constant. The controller is characterized to provide OFF-period in which the controller instructs not to feed the drive current and in which the controller detects a voltage developed across the winding and determines the ongoing amplitude based upon the detected voltage. Thus, the winding can be best utilized commonly to drive the motor and to sense the ongoing amplitude or motion of the vibrator, thereby eliminating an additional sensor for detection of the motion of the vibrator.

11 Claims, 6 Drawing Sheets

CONTROL SYSTEM FOR A LINEAR VIBRATION MOTOR

BACKGROUND OF THE INVENTION

1. Field of the Invention

The present invention is directed to a control system for a linear vibration motor, and more particularly to a system of driving a vibrator linearly with respect to a stator at a uniform amplitude.

2. Description of the Prior Art

U.S. Pat. No. 5,632,087 discloses a linear vibration motor composed of a stator with a winding and a vibrator with a permanent magnet. A drive current is fed to the winding to generate a magnetic field with interacts with the permanent magnet to reciprocate the vibrator linearly relative to the stator. A coil sensor is additionally provided in an opposed relation with permanent magnets embedded in the vibrator to produce a voltage which is indicative of the speed of the vibrator, i.e., an ongoing amplitude of the vibrator in motion. Based upon the ongoing amplitude, a control is made to vary the drive current in order to keep the amplitude constant at a desired level. However, this control system requires the coil sensor which gives an additional cost and requires an additional space for the sensor, making it difficult to reduce the vibration motor into a compact structure with a reduced cost.

Another prior art is Japanese Patent Early Publication No. 62-285655 which discloses an actuator with a speed feedback control composed of a vibrator with first and second windings and a stator with a permanent magnet. The first windings is utilized to solely receive a drive current for moving the vibrator, while the second winding is utilized selectively to receive the drive current and to sense a voltage indicative of the speed of the vibrator for feedback control of the actuator based upon the voltage. The selection of the functions is made by a switch so that the second winding does not act to drive the vibrator while the second winding is switched to act as the sensor, and vice versa. Thus, the actuator necessitates at least two windings, which is a still hindrance to compacting the structure.

Further, Japanese Patent Early Publication No. 49-77116 discloses a voice-coil type linear motor composed of a vibrator with a moving coil and a stator with a permanent magnet. The moving coil receives a drive current to be driven thereby to vibrate and generate a voltage including a component indicative of the speed of the moving coil. An equivalent circuit to the moving coil is provided to give an output corresponding to a voltage of the moving coil in a stationary state. The output is compared to the voltage of the moving coil in motion in order to derive the component indicative of the speed of the moving coil. Bases upon thus derived component or the speed of the moving coil, a control is made to drive the moving coil. In this prior art, the equivalent circuit adds an extra bulk to the structure, making it difficult to achieve a compact design for the linear motor.

SUMMARY OF THE INVENTION

In view of the above problems, the present invention has been achieved to provide a control system for a linear vibration motor which is capable of eliminating a separate sensor of detecting the motion of the motor for reducing a number of components and a manufacturing cost as well as reducing an overall size of the liner vibration motor. The linear vibration motor comprises a stator provided with one of a permanent magnet and a winding, and a vibrator provided with the other of the permanent magnet and the winding. The winding is fed with a drive current to generate a magnetic field which interacts with the permanent magnet to cause the vibrator to reciprocate linearly relative to the stator for producing a vibration. The control system in accordance with the present invention includes a controller which detects an ongoing amplitude, i.e., the motion represented by the displacement, speed, or acceleration of the vibrator and provides ON-periods of feeding the driving current to the winding in a varying amount based upon the ongoing amplitude detected in order to keep a vibration amplitude of the vibrator constant. The controller is characterized to provide OFF-period in which the controller instructs not to feed the drive current and in which the controller detects a voltage developed across the winding and determines the ongoing amplitude based upon the detected voltage. Thus, the winding can be best utilized commonly to drive the motor and to sense the ongoing amplitude or motion of the vibrator, thereby eliminating an additional sensor for detection of the motion of the vibrator.

The vibrator vibrates at substantially a fixed frequency. Due to the know frequency, the controller provides a first OFF-period which is set to continue for a predetermined duration within which the vibrator is expected to reach a maximum displacement. Then, the controller determines a reference time within the first OFF-period when the voltage across the winding becomes zero as indicative of that the vibrator reaches the maximum displacement. Based upon the reference time, the controller determines a subsequent ON-period after a first predetermined time interval from the reference time, and determines a subsequent OFF-period after a second time interval from the reference time. Thus, the reference time can be renewed each time the voltage becomes zero in the OFF-period, enabling to provide the subsequent ON-period as well as OFF-period accurately for consistent control of the linear motor.

Preferably, the controller reads the voltage across the winding at a detection timing after a predetermined time from the reference time so as to determine the ongoing amplitude of the vibrator from the voltage.

Alternately, the controller may be designed to obtain a time difference within the OFF-period between a first timing at which the voltage reaches a first reference voltage and a second timing at which the voltage reaches a second reference voltage which is different from the first reference voltage. Then, the controller determines the ongoing amplitude of the vibrator from thus obtained time difference. In this case, the first reference voltage is set to be zero so that the controller can determine the first timing as the reference time.

Further, the controller may be designed to obtain a voltage difference between a first voltage of the winding detected at a first predetermined time from the reference time and a second voltage of the winding detected at a second predetermined time from the reference time. The first and second predetermined times are within the OFF-period and different from each other. Then, the controller determines the ongoing amplitude of the vibrator from thus obtained voltage difference.

The OFF-period may be defined within each cycle of the vibration or alternately be defined to appear only once within more than one cycle of the vibration.

The driven current is in the form of a pulse-width-modulated (PWM) signal having a variable width corresponding to the ON-period. The ON-period is limited to have a maximum width to afford the OFF-period in one cycle of the vibration.

Preferably, the controller is designed to feed the drive current partly in the form of a pulse-width-modulated (PWM) signal during a first fraction ON-period of variable width and the rest in the form of a fixed width signal during a second fraction ON-period of fixed width. The first ON-period occurs in a half cycle of a particular cycle of the vibration, while the second ON-period occurs in the other half cycle of the same cycle so that the OFF-period occurs together with the second ON-period within the other half cycle. Thus, the vibrator can receive driving forces which are generated respectively in the half cycles and act in opposite moving directions, thereby making efficiently controlled vibration.

The controller is preferred to include a low amplitude compensator which monitors the ongoing amplitude of the vibration and issues a restriction signal when the ongoing amplitude is lower than a minimum reference amplitude. In response to the restriction signal, the controller disables to provide the OFF-period and at the same time elongates the ON-period to feed the drive current to a maximum extent over the following predetermined cycles of said vibration. Thus, the vibrator can be rapidly restored to vibrate at the intended amplitude.

These and still other objects and advantageous features of the present invention will become more apparent from the following detailed description of the preferred embodiment when taken in conjunction with the attached drawings.

DETAILED DESCRIPTION OF THE EMBODIMENT

Figure 1:
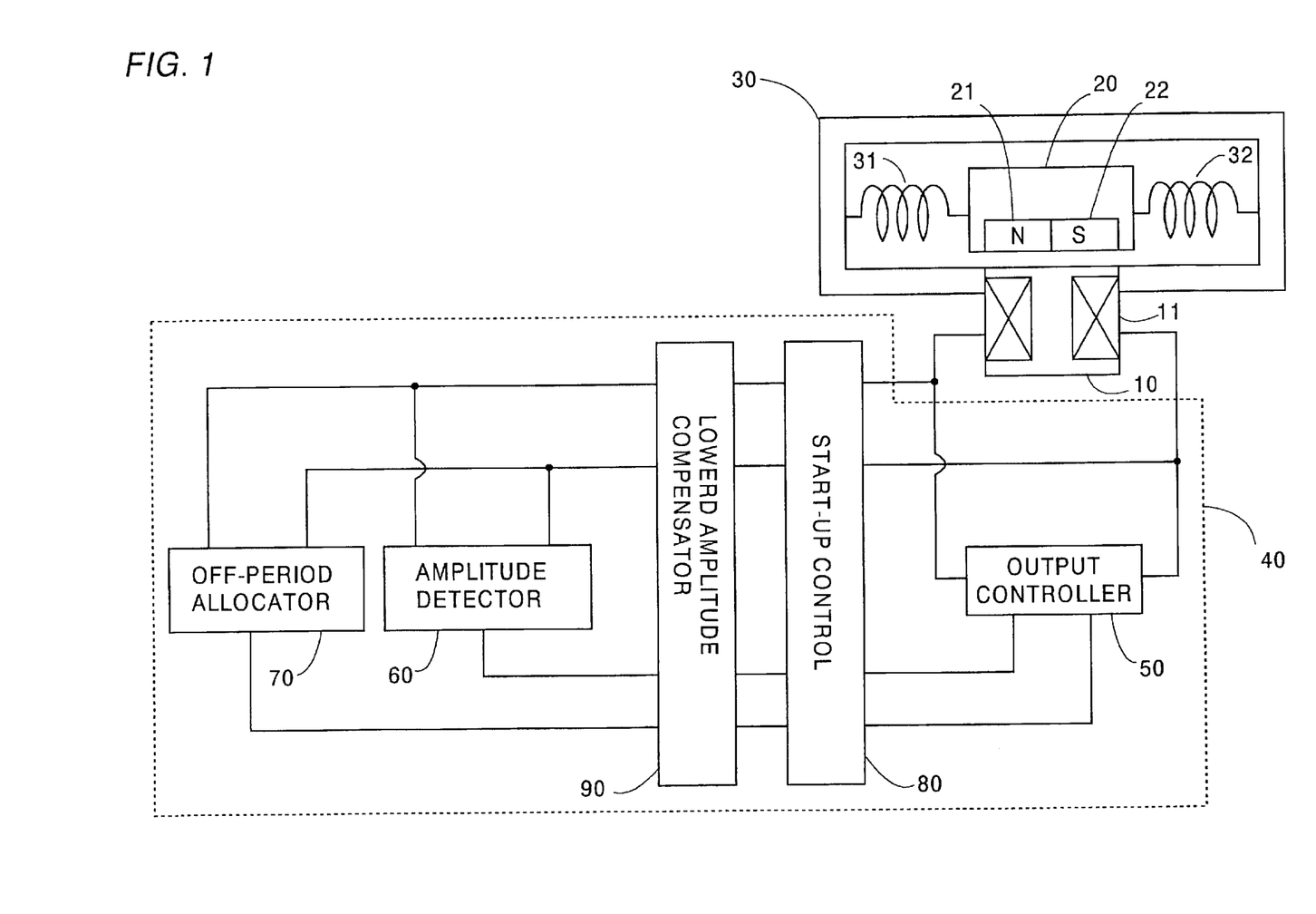
FIG. 1 is a schematic view of a control system for a linear vibration motor in accordance with a preferred embodiment of the present invention.

Referring now to FIG. 1, there is shown a control system for a linear vibration motor in accordance with a preferred embodiment of the present invention. The liner vibration motor comprises a stator 10 with a single winding 11 and a vibrator 20 embedded with a set of permanent magnets 21 and 22. The stator 10 is mounted to a frame 30 to which the vibrator 20 is coupled by means of springs 31 and 32. The winding 11 is energized by a controller 40 to generate a magnetic field which interacts with the permanent magnets 21 and 22 to develop a driving force of vibrating the vibrator 20 linearly with respect to the stator 10 between the opposite ends of the frame 30. The springs 31 and 32 are cooperative with a magnetic compliance of the motor to give an oscillation system having a natural frequency so that the vibrator 20 vibrates at substantially a fixed frequency.

The controller 40 includes an output controller 50 which is connected to supply a driving current in the form of a pulse-width-modulated (PWM) signal to the winding 11 for developing the driving force of moving the vibrator 20. That is, the output controller 50 provides an ON-period of varying width during which the drive current is fed to the winding. A feedback control is made to vary the ON-period in accordance with an ongoing motion detected for the vibrator 20 in order to drive the vibrator 20 at a predetermined amplitude. For this purpose, the controller 40 includes an amplitude detector 60 which is connected to the winding 11 to monitor a voltage developed across the winding 11 as a parameter indicating the ongoing motion of the vibrator 20. The monitoring of the voltage is done within an OFF-period of feeding no driving current to the winding 11. Otherwise, i.e., if the monitoring be done within the ON-period of feeding the driving current, the monitored voltage would involve a component resulting from the driving current and therefore could not be indicative of the ongoing motion of the vibrator 20. Also included in the controller 40 is an OFF-period allocator 70 which issues to the output controller 50 an allocation signal determining the start and end of the OFF-period so that the output controller 50 gives the OFF-period of not feeding the driving current to the winding 11. The allocator 70 determines the start and end of the OFF-period based upon a reference time at which the vibrator 20 sees a maximum displacement or moves to one stroke-end of the vibration. It is known that, when the vibrator 20 sees the maximum displacement during the OFF-period, a voltage across the winding 11 becomes zero. In view of this, the allocator 70 monitors the voltage across the winding 11 to acknowledge the reference time when the voltage becomes zero. Further, the controller 40 includes a start-up controller 80 and a lowered amplitude compensator 90. The start-up controller 80 defines a start-up sequence of feeding the drive current over several cycles of the vibration without providing the OFF-period for successfully starting the vibration. The compensator 90 is provided to deal with an unexpected lowering of the ongoing amplitude and restore the vibration of the intended amplitude quickly by feeding the drive current to a maximum extent without providing the OFF-period over the following several cycles of the vibration after detection of the lowered ongoing amplitude.

Figure 2:
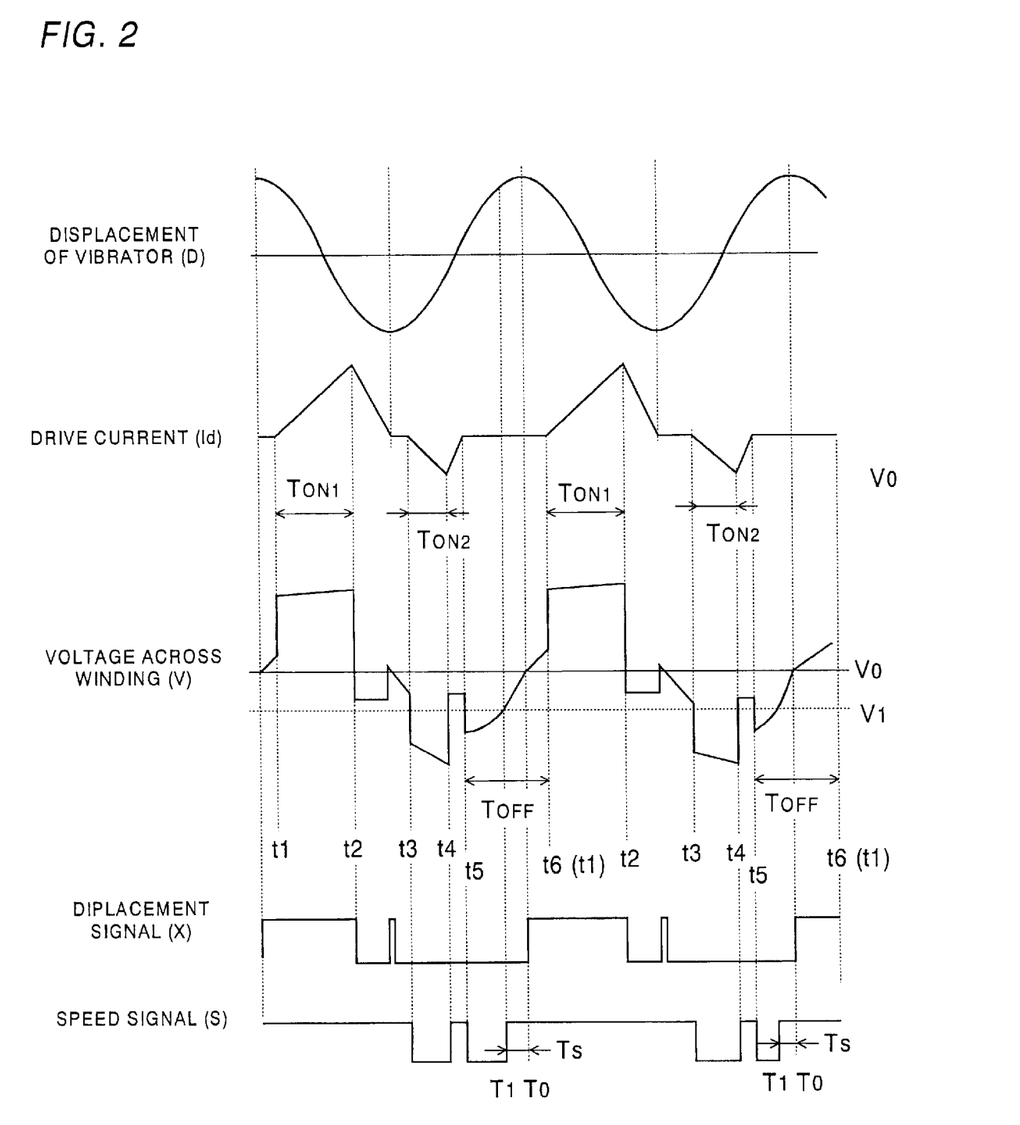
FIG. 2 is a waveform chart illustrating the operation of the control system.

The ON-period and the OFF-periods are determined in a manner as shown in FIG. 2 which includes a displacement curve D of the vibrator, the drive current Id, the voltage V developed across the winding, a displacement signal X for detection of the maximum displacement, and a speed signal S for detection of the speed of the vibrator 20. As seen in FIG. 2, the ON-periods $T_{ON}1$ and $T_{ON}2$ are set to appear respectively in the adjacent half cycles of the vibration so that the drive current is fed in each half cycle to force the vibrator in each direction. Whenever the OFF-period $T_{OFF}$ is required, it is set to appear only in one half cycle subsequent to the ON-period $T_{ON}2$ in such a manner that the vibrator sees the maximum displacement during this OFF period $T_{OFF}$. Operation of the control system is now explained with reference to FIG. 2 and a flow chart of FIG. 3. Upon energization of the motor, the start-up sequence is made in which the start-up controller 80 operates to determine the maximum width of the ON-period within each half cycle of the vibration as well as to activate a start-up counter so that the start-up sequence continues over initial cycles of the vibration. In operation, if the counter gives less time count than the predetermined counts defining the initial cycles, the start-up sequence is judged to continue and a control proceeds to set a start-up mode on, followed by that the output controller 50 determines the start and end timing of the ON-periods and supplies the drive current during the ON-periods for driving the vibrator 20. During the start-up sequence, the OFF-period allocator 70 is rendered inactive so as not to provide the OFF-period. When the counter gives the predetermined counts or more, the start-up sequence is judged to be ended and the control proceeds to set the start-up mode off and to repeat one sequence of feeding the drive current. Thereafter, i.e., after the start-up mode is set off, the OFF-period allocator 70 is operative to provide the first OFF-period within which the vibrator is expected to see the maximum displacement, as shown in FIG. 2. That is, the allocation signal indicating the start t5 and end t6 of the OFF-period is fed from the allocator 70 to the output controller 50. At this time, the output controller 50 determines the ON-periods of suitable width and therefore provide the ON-periods for feeding the drive current, and the OFF-period for detection of the ongoing amplitude. That is, the output controller 50 determines the ON-periods $T_{ON}1$ and $T_{ON}2$ which starts and ends respectively at times t1 and t2, and times t3 and t4. Based upon these settings the output controller 50 feeds the drive current for driving the vibrator while leaving the OFF-period $T_{OFF}$ (t5 to t6), after which the control proceeds to a normal feedback control mode.

In the feedback control mode, the OFF-period allocator 70 is operative to obtain within the OFF-period the reference time $T_0$ at which the voltage across the winding becomes zero as indicative of that the vibrator 20 reaches the maximum displacement. Thus obtained reference time $T_0$ serves as a basis upon which the next ON-periods as well as the next OFF-period are set on a time axis. Also within the OFF-period, the amplitude detector 60 is operative to detect a time difference $T_S(=T_0-T_1)$ between a time $T_0$ at which the voltage across the winding is zero $V_0$ and a time $T_1$ at which the voltage is $V_1$ lower than $V_0$. The time difference $T_S$ is indicative of an acceleration of the moving vibrator 20 at the particular time or phase of the vibration, and is processed to obtain the ongoing amplitude expected for the vibrator 20. The ongoing amplitude can be definitely determined from the acceleration due to the fact that the vibrator oscillates at the fixed frequency along a sinusoidal curve. Thus, the acceleration at the particular time or phase can induce a specific sinusoidal curve with a specific amplitude. Similarly, the voltage indicative of the speed of the vibrator at the particular time can definitely induce the ongoing amplitude. Therefore, the amplitude detector could monitor the voltage at the particular time to obtain the ongoing amplitude.

Figure 4:
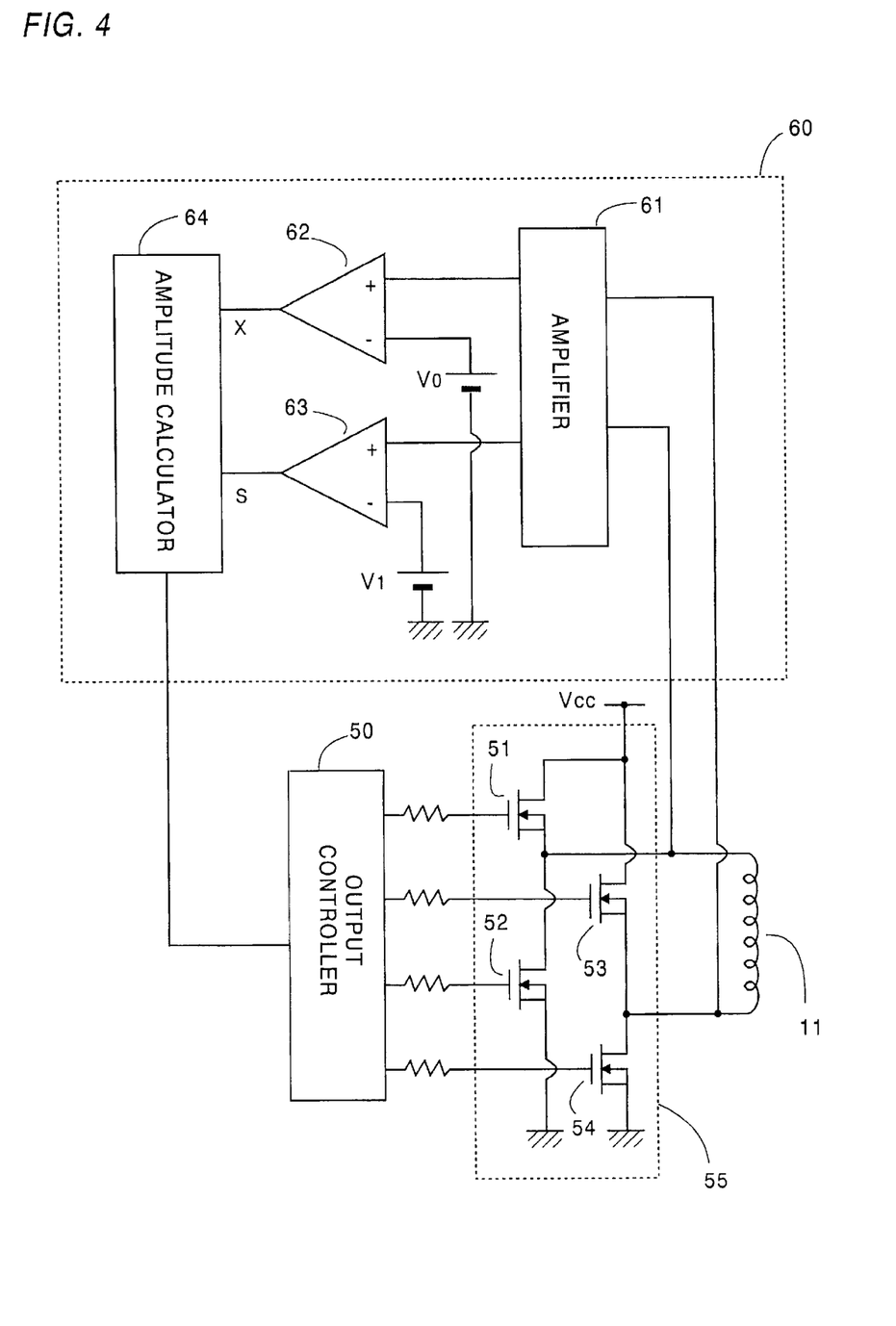
FIG. 4 is a schematic view of an amplitude detector utilized in the above system.

FIG. 4 shows details of the amplitude detector 60 for detection of the above time difference $T_S$ $(=T_0-T_1)$. The detector 60 comprises an amplifier 61, a pair of comparators 62 and 63, and an amplitude calculator 64. The amplifier 61 amplifies the voltage across the winding 11 to provide the resulting amplified voltage to the comparators 62 and 63. The first comparator 62 compares the amplified voltage with a first reference voltage corresponding to $V_0$ to provide the displacement signal X which becomes high when the former voltage proceeds the latter, as shown in FIG. 2. The second comparator 63 compares the amplified voltage with a second reference voltage corresponding to $V_1$ and provides the speed signal S which becomes high when the former voltage exceeds the latter, as shown in FIG. 2. The signals X and S are fed to the amplitude calculator 64 where the signals are processed to obtain the time difference $T_S$ and calculate the ongoing amplitude from the time difference as discussed in the above. Thus calculated ongoing amplitude is fed back to the output controller 50 which responds to turn on and off transistors 51 to 54 of a driver 55 for feeding the drive current during the variable ON-periods.

Turning back to FIG. 3, if the ongoing amplitude is found not to be lower than a minimum reference level during the feedback mode, the output controller 50 determines the width of the next ON-period in compensation for the detected ongoing amplitude in order to keep the vibration amplitude constant. Then, the OFF-period allocator 70 sets the start and end timings t5 and t6 of the next OFF-period based on the reference time $T_0$. Subsequently, the output controller 50 sets the start and end timings t1 and t2 and t3 and t4 of the next ON-periods in consideration of the determined width of the ON-period and the start and end timing of the next OFF-period. Thereafter, the output controller 50 operates to feed the drive current during the ON-periods for driving the vibrator 20. In this embodiment, the OFF-period is set in each following cycle of the vibration to determine the reference time $T_0$ and monitor the ongoing voltage for continued feedback control of the motor based upon the monitored ongoing amplitude unless the ongoing amplitude becomes lower than the minimum reference level.

Figure 3:
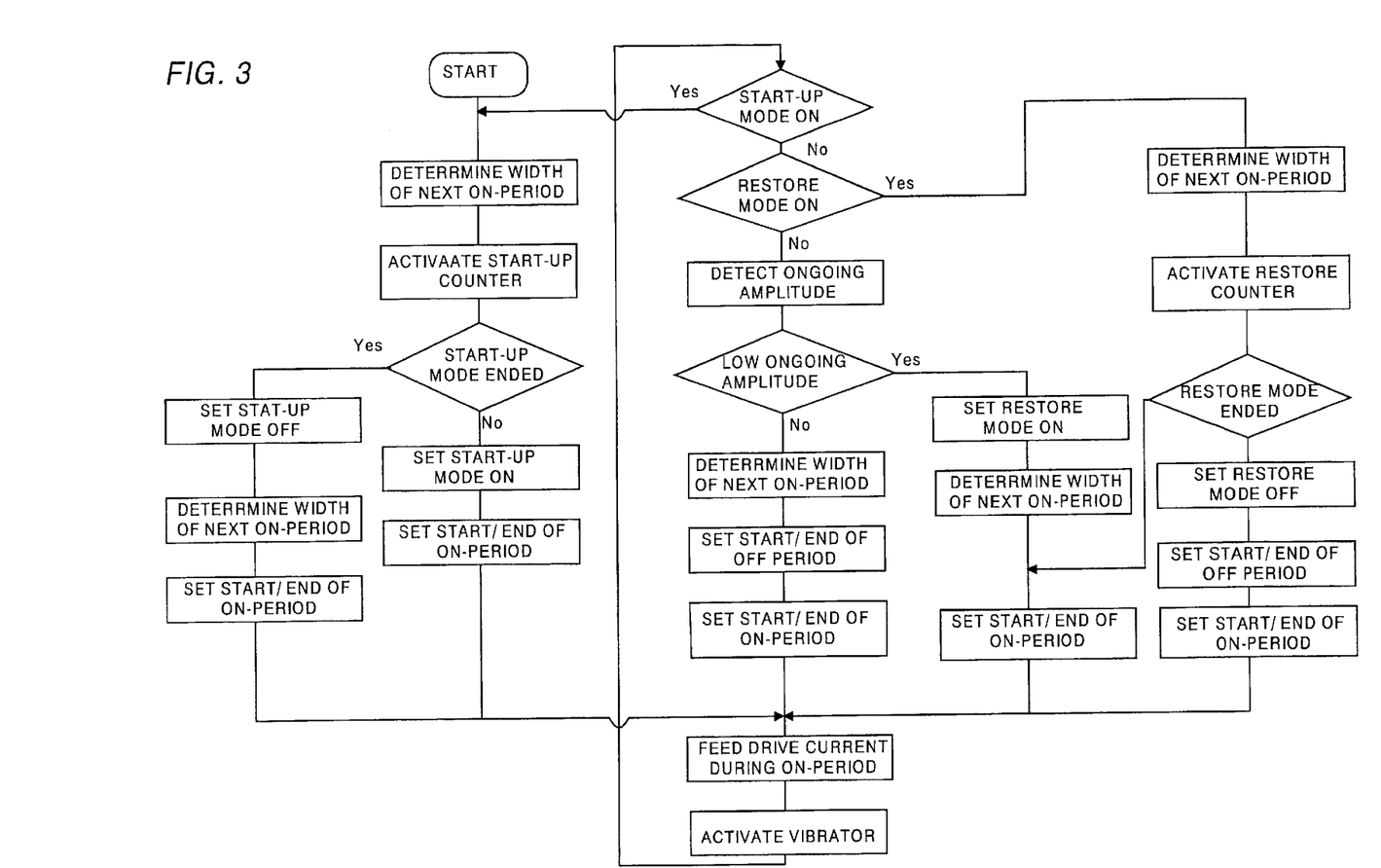
FIG. 3 is a flow chart illustrating the operation of the control system.

The lowered amplitude compensator 90 is provided to monitor the ongoing amplitude and issues a restriction signal when the monitored ongoing amplitude becomes lower than the minimum reference level. In response to the restriction signal, a restore mode is set on, instructing the output controller 50 to provide no OFF-period and provide the ON-period of maximum width for feeding the drive current sufficiently in order to rapidly restore the vibration of the intended amplitude. Thus, the output controller 50 determines the start and end of the elongated ON-period and feeds the drive current in the immediately subsequent one cycle of the vibration. Once the restore mode is set on due to the lowered ongoing amplitude, the control sequence branches off to a restoring routine until the restore mode is set off after repeating several cycles of the vibration. The restoring routine begins with the determination of the maximum ON-period followed by activating a restore counter. Until the restore counter reaches predetermined counts, the output controller 50 feeds the drive current during the elongated ON-period for driving the vibrator at the maximum force. When the restore counter reaches the predetermined counts, the restore mode is set off so that the output counter 50 provides the ON-period as well as the OFF-period by setting the start and end timings respectively for the ON-period and the OFF-period and feed the drive current. Thereafter, the control sequence goes back to the feedback control mode.

In this embodiment, the two ON-periods are set in each cycle of the vibration in such a manner that the first ON-period $T_{ON}1$ appearing in one half cycle has a fixed width and the second ON-period $T_{ON}2$ appearing in the other half cycle has a variable width responsible for the feedback control. Thus, the PWM control is required only during the half cycle of the vibration, thereby simplifying a structure of controlling the switching transistors of the driver 55 responsible for feeding the drive current to the winding.

It is noted in this connection that the second ON-period $T_{ON}2$ has a limited width to afford the OFF-period in the same half cycle in which the drive current as well as a residual current does not flow. Also, the OFF-period is set to terminate shortly after the timing when the vibration reaches the maximum displacement so that the ON-period $T_{ON}1$ starts just after the timing for increased driving efficiency of the motor.

Figure 5:
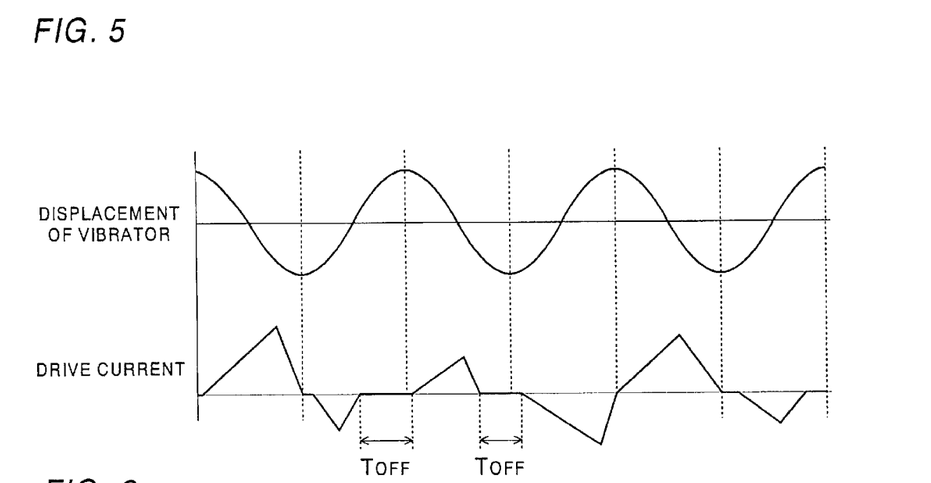
FIGS. 5 and 6 are waveform charts illustrating modified manners of providing an OFF-period which may be utilized in the above control system.
Figure 6:
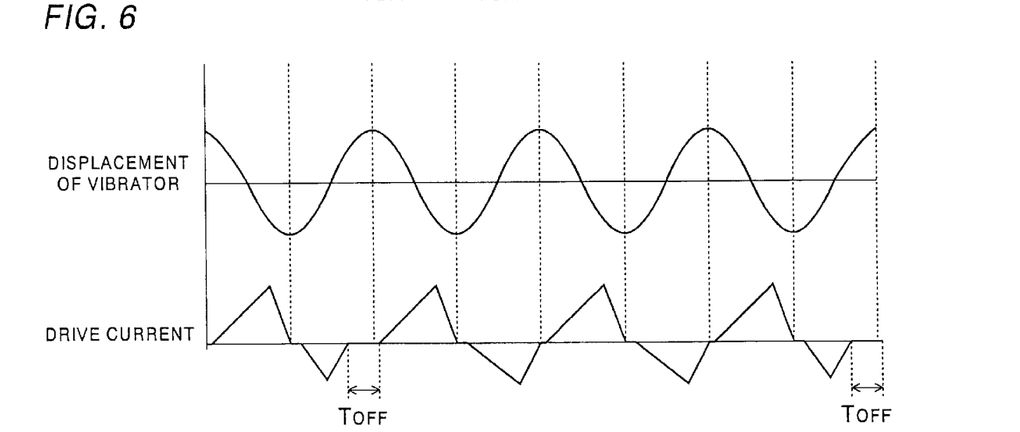

Although in the above embodiment, the OFF-period is set in the half cycle of the vibration where the vibrator moves in one particular direction, the OFF-period $T_{OFF}$ may be set to appear alternately in one half cycle and the other half cycle of the vibration, as shown in FIG. 5, so that the ongoing amplitude can be detected while the vibrator moves in one direction at a time and in the opposite direction at the next time. Further, as shown in FIG. 6, the OFF-period $T_{OFF}$ may be set to appear once within several cycles of the vibration. In this condition, the feedback control of varying the ON-periods may be made stepwise within the several cycles of the variation.

Figure 7:
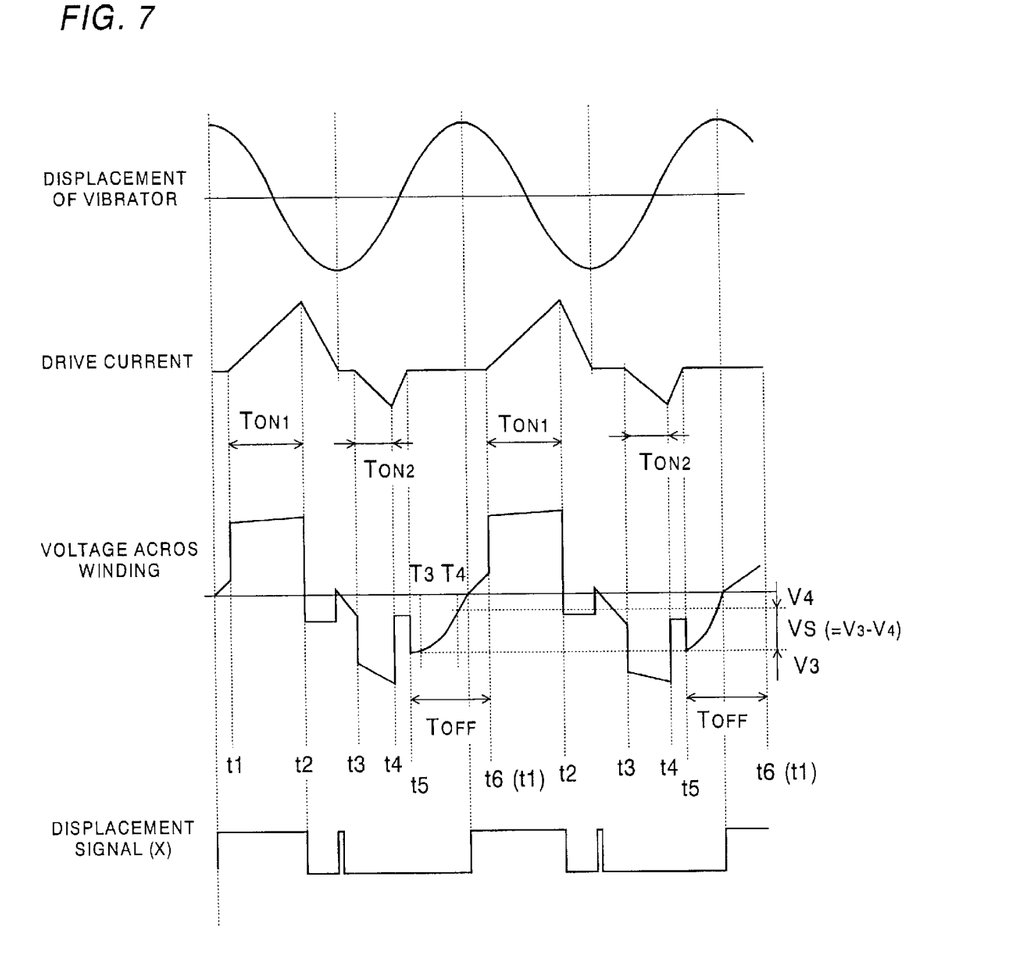
FIG. 7 is a waveform chart illustrating the operation of a modification of the above control system.

As shown in FIG. 7 which is a modification of the above embodiment, the amplitude detector 50 may be configured to determine the ongoing amplitude based upon a difference $V_S$ (=$V_3$–$V_4$) in the voltage developed across the winding 11 between a first voltage $V_3$ detected at a time $T_3$ and a second voltage $V_4$ detected at a time $T_4$. Times $T_3$ and $T_4$ are set to be within the OFF-period and are measured from the reference time $T_0$. Thus obtained voltage difference $V_S$ is indicative of the acceleration of the vibrator at the particular time and is processed to give the ongoing amplitude for effecting the feedback control.

What is claimed is:

1. A control system for a linear vibration motor, said linear vibration motor comprising:
    a stator provided with one of a permanent magnet and a winding;
    a vibrator provided with the other of said permanent magnet and said winding, and
    said winding being fed with a drive current to generate a magnetic field which interacts with said permanent magnet to cause said vibrator to reciprocate linearly relative to said stator for producing a vibration;
    said control system including:
        a controller which detects an ongoing amplitude of said vibrator and provides ON-periods of feeding said driving current to said winding in a varying amount based upon the ongoing amplitude detected in order to keep a vibration amplitude of said vibrator constant;
        wherein said controller provides OFF-periods in which said controller instructs not to feed said driving current and in which said controller detects a voltage developed across said winding and determines said the ongoing amplitude based upon said voltage.

2. The control system as set forth in claim 1, wherein said vibrator vibrates at substantially a fixed frequency,
    said controller providing a first OFF-period which is set to continue for a predetermined duration within which said vibrator is expected to reach a maximum displacement,
    said controller determining a reference time within said first OFF-period when the voltage across said winding becomes zero as indicative of that said vibrator reaches the maximum displacement,
    said controller determining a subsequent ON-period after a first predetermined time interval from said reference time, and determining a subsequent OFF-period after a second time interval from said reference time.

3. The control system as set forth in claim 2, wherein said controller reads the voltage across said winding at a detection timing after a predetermined time from said reference time so as to determine said ongoing amplitude of said vibrator.

4. The control system as set forth in claim 1, wherein said controller detects a time difference within said OFF-period between a first timing at which said voltage reaches a first reference voltage and a second timing at which said voltage reaches a second reference voltage which is different from said first reference voltage, said controller determining the ongoing amplitude of said vibrator from said time difference.

5. The control system as set forth in claim 4, wherein said first reference voltage is zero so that said controller determines said first timing as said reference time.

6. The control system as set forth in claim 2, wherein said controller detects a voltage difference between a first voltage of said winding detected at a first predetermined time from said reference time and a second voltage of said winding detected at a second predetermined time from said reference time, said first and second predetermined times being within said OFF-period and different from each other, and said controller determining the ongoing amplitude of said vibrator from said voltage difference.

7. The control system as set forth in claim 1, wherein said OFF-period is defined within each cycle of said vibration.

8. The control system as set forth in claim 1, wherein said OFF-period is defined to appear only once within more than one cycle of said vibration.

9. The control system as set forth in claim 1, wherein said controller is responsible for feeding said drive current in the form of a pulse-width-modulated (PWM) signal during said ON-period having a correspondingly variable width, and said ON-period is limited to have a maximum width.

10. The control system as set forth in claim 1, wherein said controller is responsible for feeding said drive current partly in the form of a pulse-width-modulated (PWM) signal during a first ON-period of variable width and the rest in the form of a fixed width signal during a second ON-period of fixed width, said first ON-period occurring in a half cycle of a particular cycle of said vibration, and said second ON-period occurring in the other half cycle of said particular cycle so that said OFF-period occurs together with said second ON-period within said other half cycle.

11. The control system as set forth in claim 1, wherein said controller includes a low amplitude compensator which monitors the ongoing amplitude of said vibration and issues a restriction signal when said ongoing amplitude is lower than a minimum reference amplitude, said restriction signal disabling to provide said OFF-period and at the same time elongating the ON-period to feed said drive current to a maximum extent over the following over the following predetermined cycles of said vibration.

* * * * *